(12) United States Patent
Lee et al.

(10) Patent No.: US 12,231,957 B2
(45) Date of Patent: Feb. 18, 2025

(54) ELECTRONIC DEVICE FOR CONFIGURING SYSTEM PARAMETERS RELATED TO LOAD CONTROL IN MULTI-FREQUENCY WIRELESS COMMUNICATION NETWORK AND OPERATION METHOD THEREOF

(71) Applicant: Samsung Electronics Co., Ltd., Suwon-si (KR)

(72) Inventors: Hyonseung Lee, Suwon-si (KR); Jongkyung Kim, Suwon-si (KR); Myonghee Park, Suwon-si (KR); Jungmin Choi, Suwon-si (KR); Wontai Kim, Suwon-si (KR); Jeongho Park, Suwon-si (KR); Jaeyoung Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 17/746,408

(22) Filed: May 17, 2022

(65) Prior Publication Data

US 2022/0386174 A1 Dec. 1, 2022

(30) Foreign Application Priority Data

May 25, 2021 (KR) .......................... 10-2021-0066643
Sep. 23, 2021 (KR) .......................... 10-2021-0125587

(51) Int. Cl.
*H04W 28/08* (2023.01)
*H04W 28/082* (2023.01)
*H04W 28/10* (2009.01)
*H04W 36/00* (2009.01)
*H04W 76/20* (2018.01)

(52) U.S. Cl.
CPC ..... *H04W 28/0942* (2020.05); *H04W 28/082* (2023.05); *H04W 28/10* (2013.01); *H04W 76/20* (2018.02); *H04W 36/00837* (2018.08)

(58) Field of Classification Search
CPC ............. H04W 28/0942; H04W 76/20; H04W 28/082; H04W 28/10; H04W 36/00837
See application file for complete search history.

(56) References Cited

U.S. PATENT DOCUMENTS

| | | | |
|---|---|---|---|
| 8,301,156 B2 | 10/2012 | Del Rio-Romero et al. | |
| 2015/0119020 A1* | 4/2015 | Henderson | H04L 43/00 455/423 |
| 2015/0131537 A1* | 5/2015 | Chiang | H04L 5/0057 370/329 |
| 2017/0353874 A1* | 12/2017 | Harrang | H04L 43/0864 |
| 2020/0008084 A1* | 1/2020 | Das | H04W 24/08 |

* cited by examiner

*Primary Examiner* — Joseph E Avellino
*Assistant Examiner* — Maryam Emadi
(74) *Attorney, Agent, or Firm* — Jefferson IP Law, LLP

(57) ABSTRACT

An apparatus and method for configuring system variables related to load control in an electronic device is provided. The electronic device includes a communication circuit, and a processor configured to identify a traffic pattern for each cell based on at least one of the plural statistical indicators, in case of determining to update a system variable of cell based on the traffic pattern, configure at least one of the plural statistical indicators as a controlling indicator, and update at least one system variable for at least one cell based on the required change amount of the at least one controlling indicator.

20 Claims, 15 Drawing Sheets

ELECTRONIC DEVICE FOR CONFIGURING SYSTEM PARAMETERS RELATED TO LOAD CONTROL IN MULTI-FREQUENCY WIRELESS COMMUNICATION NETWORK AND OPERATION METHOD THEREOF

CROSS-REFERENCE TO RELATED APPLICATION(S)

This application is based on and claims priority under 35 U.S.C. § 119(a) of a Korean patent application number 10-2021-0066643, filed on May 25, 2021, in the Korean Intellectual Property Office, and of a Korean patent application number 10-2021-0125587, filed on Sep. 23, 2021, in the Korean Intellectual Property Office, the disclosure of each of which is incorporated by reference herein in its entirety.

TECHNICAL FIELD

The disclosure relates to an apparatus and method for configuring system variables related to load control in a wireless communication system supporting multiple frequencies.

BACKGROUND ART

With advances in information communication technology and semiconductor technology, various communication functions using wireless communication networks are provided. For example, communication functions using a wireless communication network may provide not only a voice call function but also a multimedia communication function for transmitting and/or receiving data.

The above information is presented as background information only to assist with an understanding of the disclosure. No determination has been made, and no assertion is made, as to whether any of the above might be applicable as prior art with regard to the disclosure.

DISCLOSURE

Technical Problem

As communication functions using a wireless communication network are diversified according to the time and/or location (e.g., place), a wireless communication system requires a method for optimizing network quality or preventing network quality degradation.

Aspects of the disclosure are to address at least the above-mentioned problems and/or disadvantages and to provide at least the advantages described below. Accordingly, an aspect of the disclosure is to provide an apparatus and method for optimizing system variables by time and/or location in order to optimize network operation in a wireless communication system supporting multiple frequencies.

Additional aspects will be set forth in part in the description which follows and, in part, will be apparent from the description, or may be learned by practice of the presented embodiments.

Technical Solution

In accordance with an aspect of the disclosure, an electronic device in a wireless communication system supporting multiple frequencies is provided. The electronic device includes a communication circuit, and a processor operably connected to the communication circuit. The processor may be configured to collect, through the communication circuit, a plurality of statistical indicators for each of a plurality of cells managed by multiple base stations, identify a traffic pattern for each cell based on at least one of the plurality of statistical indicators, configure, in case of determining to update a system variable of at least one cell based on the traffic pattern for each cell, at least one of the plurality of statistical indicators as a controlling indicator based on a correlation between a performance indicator of the statistical indicators and the other statistical indicators, identify a required change amount of the at least one controlling indicator based on the traffic pattern for each cell, update at least one system variable for at least one cell based on the required change amount of the at least one controlling indicator, and transmit, through the communication circuit, information related to the at least one updated system variable to at least one base station.

In accordance with another aspect of the disclosure, an operation method of an electronic device in a wireless communication system supporting multiple frequencies is provided. The method includes collecting a plurality of statistical indicators for each of a plurality of cells managed by multiple base stations, identifying a traffic pattern for each cell based on at least one of the plurality of statistical indicators, configuring, in case of determining to update a system variable of at least one cell based on the traffic pattern for each cell, at least one of the plurality of statistical indicators as a controlling indicator based on a correlation between a performance indicator of the statistical indicators and the other statistical indicators, identifying a required change amount of the at least one controlling indicator based on the traffic pattern for each cell, updating at least one system variable for at least one cell based on the required change amount of the at least one controlling indicator, and transmitting information related to the at least one updated system variable to at least one base station.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to attached drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
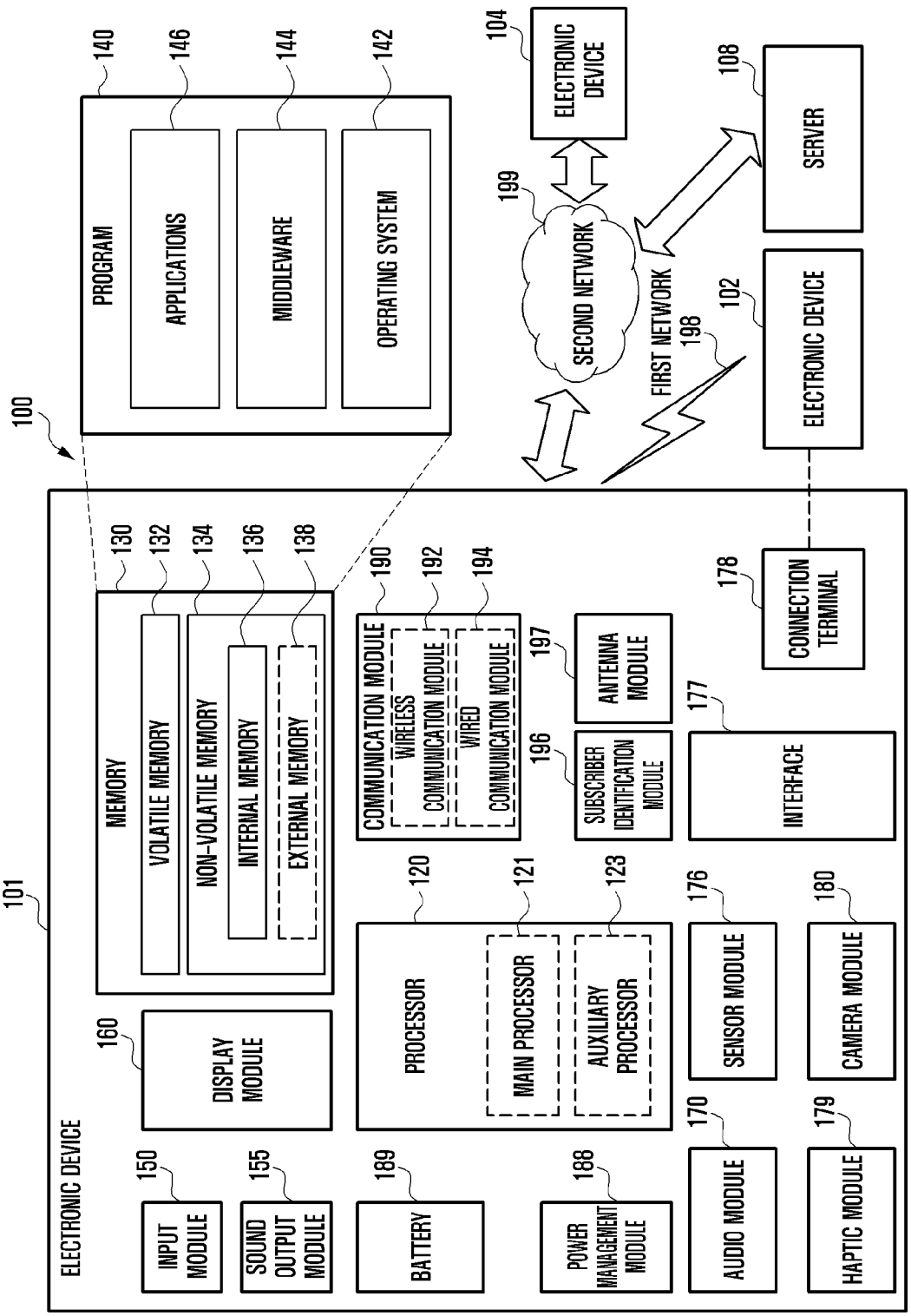
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, a base station of a wireless communication system may support a plurality of frequency bands. According to an embodiment, the base station may operate a plurality of frequency bands for each sector. That is, the base station may operate (or, manage) a plurality of cells providing a communication function through a plurality frequency bands for each sector operated (or, managed) by the base station. For example, a cell may include a service area that provides a communication function through a frequency band among a plurality of frequency bands within a sector.

According to various embodiments, a network element of a wireless communication system supporting multiple frequencies may optimize system variables to optimize network operation. According to an embodiment, when it is determined that an imbalance between cells has occurred through traffic analysis using statistical information (e.g., statistical indicators) by time and/or location (e.g., place), the network element may select a controlling indicator having a relatively high correlation to improve a specific performance indicator by using cross correlation between statistical indicators. The network element may predict the change amount of the controlling indicator based on the amount of improvement required for the specific performance indicator. The network element may configure (or, update) a system variable for changing the predicted controlling indicator by time and/or location.

Figure 2:
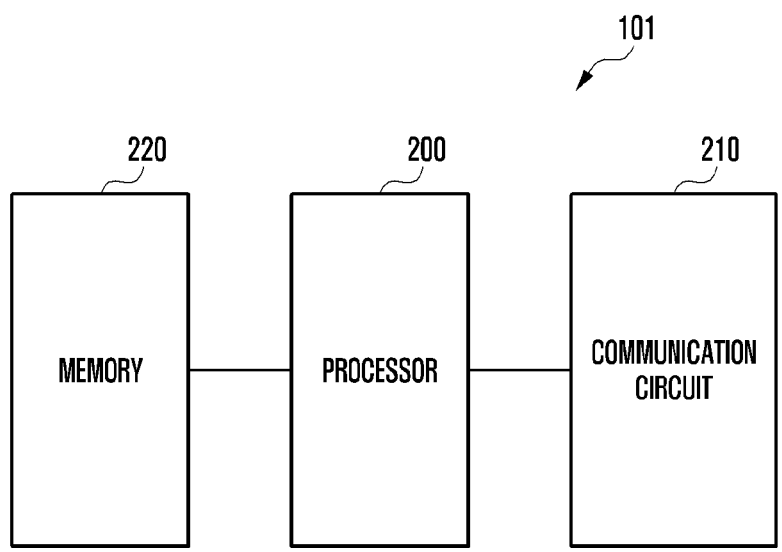
FIG. 2 is a block diagram of an electronic device for configuring system variables according to an embodiment of the disclosure.

FIG. 2 is a block diagram of an electronic device for configuring system variables according to an embodiment of the disclosure. According to an embodiment, the electronic device 101 of FIG. 2 may be at least partially similar to the electronic device 101 of FIG. 1, or may further include other embodiments of an electronic device. For example, the electronic device 101 of FIG. 2 may include a network element of a wireless communication system supporting multiple frequencies.

According to various embodiments with reference to FIG. 2, the electronic device 101 may include a processor (e.g., including processing circuitry) 200, a communication circuit 210, and/or a memory 220. According to an embodiment, the processor 200 may be substantially the same as the processor 120 in FIG. 1, or may include the processor 120. According to an embodiment, the communication circuit 210 may be substantially the same as the communication module 190 in FIG. 1, or may include the communication module 190. According to an embodiment, the memory 220 may be substantially the same as the memory 130 in FIG. 1, or may include the memory 130. According to an embodiment, the processor 200 may be operably connected to the communication circuit 210 and/or the memory 220.

According to various embodiments, the processor 200 may include various processing circuitry and collect, through the communication circuit 210, system variables and/or statistical indicators configured in the wireless communication network based on a first designated periodicity. According to an embodiment, the processor 200 may collect system variables and/or statistical information by time and/or location (e.g., place) through the communication circuit 210. For example, the processor 200 may collect system variables and/or statistical indicators for each of a plurality of cells managed by a plurality of base stations, through the communication circuit 210. For instance, the first designated periodicity is a periodicity for collecting system variables and/or statistical indicators of the wireless communication system, and may include at least one of an hourly unit, a daily unit, a weekly unit, a monthly unit, a yearly unit, or a specific time slot. For example, the system variable is a variable that can change a statistical indicator of the wireless communication system, and may include at least one of a distribution ratio of UEs, a handover variable, or a load ratio. For example, the statistical indicator is a value for detecting a traffic pattern of each cell (e.g., frequency band) operated by the base station, and may include at least one of per-cell throughput (e.g., IP throughput), load, radio resource control (RRC) user equipment (UE), active UE, physical resource usage (physical resource block (PRB) usage), or traffic volume. For example, the RRC UE may include the number of UEs RRC-connected to the base station. For example, the active UE may include the number of UEs transmitting and/or receiving data to and from the base station among the UEs RRC-connected to the base station (e.g., RRC UEs). For example, the physical resource usage may include the amount of physical resources being used (or, occupied) among all the physical resources available in the cell.

According to various embodiments, the processor 200 may analyze and predict a traffic pattern of each cell based on the statistical indicators collected on the basis of the first designated periodicity. For example, the traffic pattern may indicate a change pattern of each statistical indicator with the passage of time.

According to various embodiments, the processor 200 may identify whether an imbalance between cells occurs based on the traffic patterns of cells. According to an embodiment, when a second designated periodicity arrives, the processor 200 may select a performance indicator (or, network quality indicator) based on a traffic pattern of each of the plurality of statistical indicators. For example, the processor 200 may select a performance indicator based on at least one of a rule-based prediction method using a sliding window or a maximum likelihood (ML)-based prediction method. As an example, the performance indicator may include a statistical indicator selected to identify whether an imbalance between cells occurs among the plurality of statistical indicators. For example, the second designated periodicity may be a predefined periodicity for checking whether an inter-cell imbalance occurs, and may include the same period as or a relatively longer period than the first designated periodicity.

According to an embodiment, when the difference in performance indicator (e.g., throughput) between cells exceeds a reference difference value, the processor 200 may determine that an imbalance between cells has occurred. According to an embodiment, when the minimum value of the performance indicators of cells (e.g., throughput) is smaller than a reference value, the processor 200 may determine that an imbalance between cells has occurred.

According to various embodiments, upon determining that an imbalance between cells has occurred, the processor 200 may identify a controlling indicator corresponding to the performance indicator. According to an embodiment, the processor 200 may analyze a correlation between each of the plurality of statistical indicators and the performance indicator. The processor 200 may select a controlling indicator having a correlation with the performance indicator among the plurality of statistical indicators. As an example, the controlling indicator may include a statistical indicator that causes a change in the performance indicator among the plurality of statistical indicators. For example, the performance indicator and the controlling indicator may include different statistical indicators. For example, the processor 200 may configure a cell for improving an inter-cell imbalance among a plurality of cells as a source cell, and may configure a cell for improving the performance indicator of the source cell as a target cell. For example, the source cell may include a cell whose performance indicator is lowest among a plurality of cells included in the same sector. For example, the target cell may be selected based on an imbalance improvement amount corresponding to the required change amount of the controlling indicator. For example, the source cell and the target cell may include different cells.

According to various embodiments, the processor 200 may update at least one system variable to change the controlling indicator of the target cell. According to an embodiment, the processor 200 may select at least one system variable for inducing a change in the controlling indicator of the target cell from among the plurality of system variables. The processor 200 may optimize each of the at least one system variable in sequence based on gradient descent. For example, the processor 200 may optimize, every third designated periodicity, a first system variable among the at least one system variable by repeatedly adjusting the value of the first system variable by a specified amount. For example, the third designated periodicity may include a periodicity for updating the system variable.

According to various embodiments, the processor 200 may control the communication circuit 210 to transmit information about at least one updated system variable to the target cell (or, base station managing the target cell).

According to various embodiments, the communication circuit 210 may support transmission and/or reception of signals and/or data between the electronic device 101 and an external device (e.g., base station and/or UE) through a wireless network and/or a wired network. According to an embodiment, the communication circuit 210 may receive information related to statistical indicators for cells managed by each base station from a plurality of base stations. According to an embodiment, the communication circuit 210 may transmit information related to at least one system variable updated by the processor 200 to at least one base station. For example, the at least one base station may include a base station that manages the target cell. For example, the wireless network may include a 2nd generation (2G) network, a 3rd generation (3G) network, a 4th generation (4G) network (e.g., long term evolution (LTE)), and/or a 5th generation (5G) network (e.g., new radio (NR)).

According to various embodiments, the memory 220 may store various data used by at least one component (e.g., processor 200 and/or communication circuit 210) of the electronic device 101. According to an embodiment, the memory 220 may store various instructions that can be executed through the processor 200.

According to various embodiments, an electronic device (e.g., electronic device 101 in FIG. 1 or FIG. 2) in a wireless communication system supporting multiple frequencies may include a communication circuit (e.g., communication module 190 in FIG. 1 or communication circuit 210 in FIG. 2), and a processor (e.g., processor 120 in FIG. 1 or processor 200 in FIG. 2) operably connected to the communication circuit. The processor may be configured to collect a plurality of statistical indicators for each of a plurality of cells managed by multiple base stations through the communication circuit, identify a traffic pattern for each cell based on at least one of the plurality of statistical indicators, configure, upon determining to update a system variable of at least one cell based on the traffic pattern for each cell, at least one of the plurality of statistical indicators as a controlling indicator based on the correlation between a performance indicator of the statistical indicators and the other statistical indicators; identify a required change amount of the at least one controlling indicator based on the traffic pattern for each cell, update at least one system variable for at least one cell based on the required change amount of the at least one controlling indicator and transmit, through the communication circuit, information related to the at least one updated system variable to at least one base station.

According to various embodiments, the statistical indicators may include at least one of throughput (IP throughput), load, number of RRC-connected UEs, number of UEs under data transmission, physical resource usage (physical resource block (PRB) usage), or traffic volume.

According to various embodiments, the processor may determine to update the system variable of the at least one cell when the standard deviation of the performance indicator between the plurality of cells using different frequencies in the same sector exceeds a specified reference value.

According to various embodiments, the processor may determine to update the system variable of the at least one cell when the minimum value among the performance indicators of the plurality of cells using different frequencies in the same sector is less than or equal to a specified reference value.

According to various embodiments, the processor may configure a cell whose performance indicator is lowest among the plurality of cells as a source cell, configure one cell among other cells included in the same sector as the source cell, as a target cell, based on the required change amount of the performance indicator of the source cell, and update at least one system variable corresponding to the source cell and the target cell.

According to various embodiments, upon determining to update the system variable of the at least one cell, the processor may identify the required change amount of the performance indicator of the source cell, identify the required change amount of the controlling indicator based on the correlation between the performance indicator of the source cell and the controlling indicator of the target cell, and derive an update value of at least one system variable for the at least one cell based on the required change amount of the performance indicator of the source cell and/or the required change amount of the controlling indicator.

According to various embodiments, the required change amount of the performance indicator of the source cell may be set based on the average of performance indicators of other cells included in the same sector as the source cell and/or the standard deviation of performance indicators of the plurality of cells included in the sector.

According to various embodiments, the processor may select at least one system variable related to a change in the performance indicator from among at least one system variable corresponding to the source cell and/or the target cell, and sequentially update the at least one system variable related to a change in the performance indicator.

According to various embodiments, the at least one system variable may include a variable related to cell reselection between multiple frequencies in RRC idle mode of a UE and/or a variable related to handover between multiple frequencies in RRC connected mode of a UE.

According to various embodiments, the performance indicator and the controlling indicator may include different statistical indicators.

Figure 3:
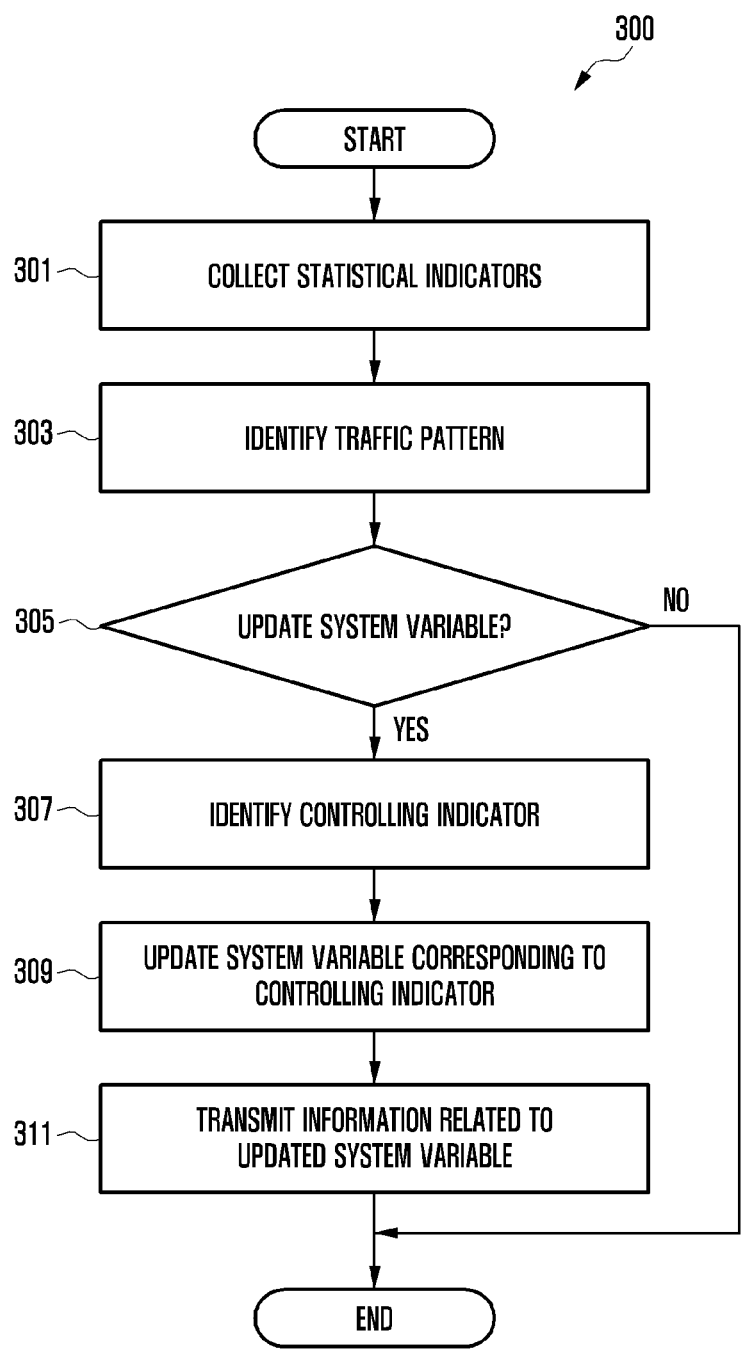
FIG. 3 is a flowchart of an electronic device to configure a system variable according to an embodiment of the disclosure.

FIG. 3 is a flowchart of an electronic device to configure a system variable according to an embodiment of the disclosure. Operations in the following embodiment may be sequentially performed, but are not necessarily performed in sequence. For example, the order of some operations may be changed, and at least two operations may be performed in parallel. For example, the electronic device of FIG. 3 is a network element of a wireless communication system supporting multiple frequencies, and may be the electronic device 101 of FIG. 1 or FIG. 2. For instance, at least a part of FIG. 3 may be described with reference to FIG. 4.

Figure 4:
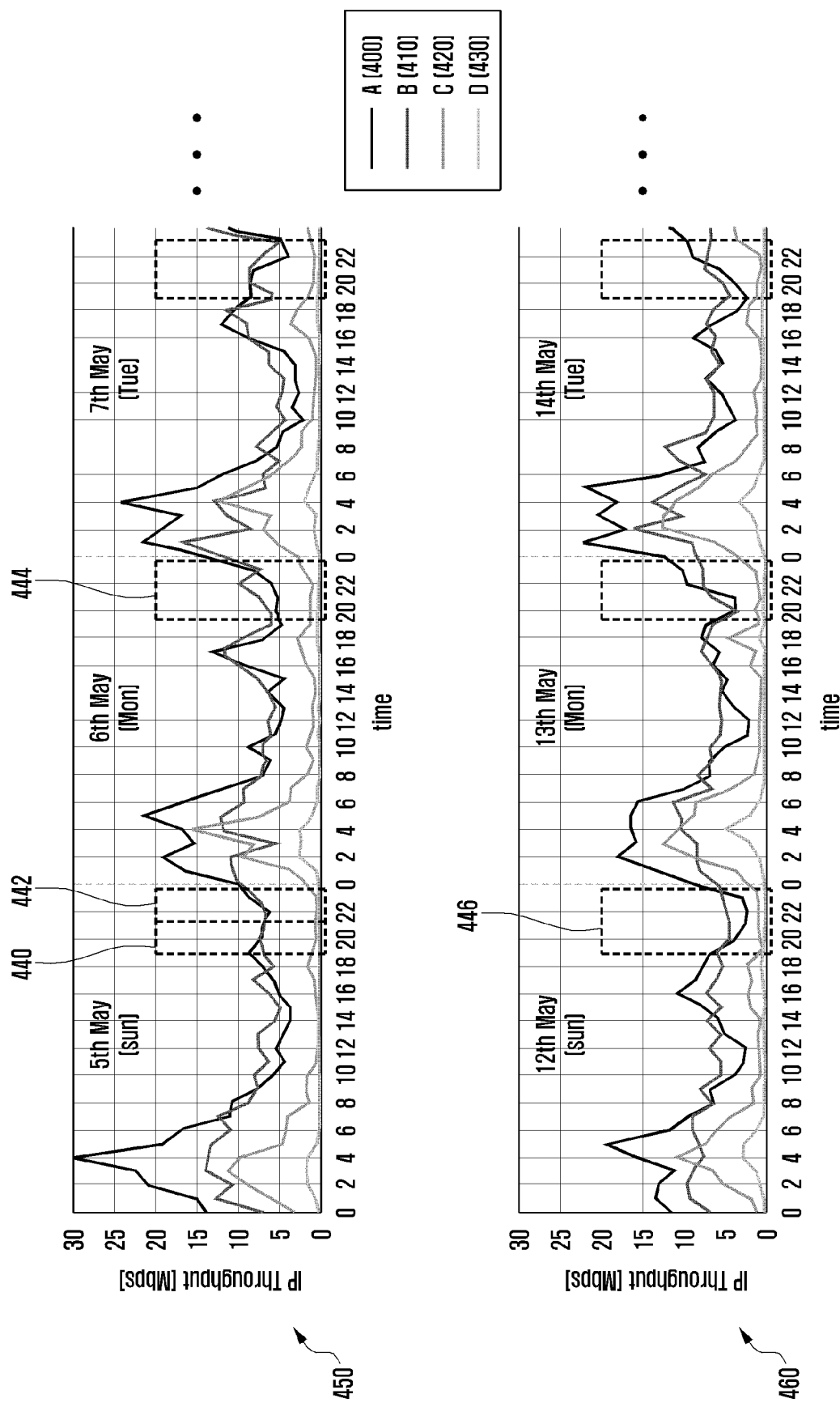
FIG. 4 is an example in which an electronic device identifies a traffic pattern according to an embodiment of the disclosure.

FIG. 4 is an example in which an electronic device identifies a traffic pattern according to an embodiment of the disclosure.

According to an embodiment with reference to flowchart 300 of FIG. 3, at operation 301, the electronic device (e.g., processor 120 in FIG. 1 or processor 200 in FIG. 2) may collect system variables and/or statistical indicators configured in the wireless communication network based on a first designated periodicity. According to an embodiment, the processor 200 may collect system variables and/or statistical indicators for each of a plurality of cells managed by a plurality of base stations through the communication circuit 210.

According to an embodiment, referring to FIG. 4, the processor 200 may collect a statistical indicator (e.g., throughput) for each of cells (cell A (400), cell B (410), cell C (420), or cell D (430)) operated by at least one base station on the basis of a time unit (e.g., first designated periodicity). For example, the first designated periodicity is a periodicity for collecting system variables and/or statistical indicators of the wireless communication system, and may include at least one of an hourly unit, a daily unit, a weekly unit, a monthly unit, a yearly unit, or a specific time slot. For example, the system variable is a variable that can change a statistical indicator of the wireless communication system, and may include at least one of a distribution ratio of UEs, a handover variable, or a load ratio. For example, the statistical indicator is a value for detecting a traffic pattern of each cell (e.g., frequency band) operated by the base station, and may include at least one of per-cell throughput (e.g., IP throughput), load, radio resource control (RRC) user equipment (UE), active UE, physical resource usage (physical resource block (PRB) usage), or traffic volume. For example, the cell may include a service area in which a base station provides a communication function using a specific frequency band.

According to various embodiments, at operation 303, the electronic device (e.g., processor 120 or 200) may identify a traffic pattern of each cell based on the statistical indicators of the individual cells collected on the basis of the first designated periodicity. According to an embodiment, the processor 200 may analyze and/or predict a change pattern of each of the statistical indicators for individual cells.

According to various embodiments, at operation 305, the electronic device (e.g., processor 120 or 200) may determine whether to update a system variable. According to an embodiment, when a second designated periodicity arrives, the processor 200 may select a performance indicator (or, network quality indicator) based on the traffic pattern of each of the plurality of statistical indicators. For example, a performance indicator may be selected based on at least one of a rule-based prediction method using a sliding window or a ML-based prediction method. As an example, the performance indicator may include a statistical indicator selected to determine whether an imbalance between cells occurs among the plurality of statistical indicators. For example, the second designated periodicity is a predefined periodicity for identifying whether an inter-cell imbalance occurs, and may include the same period as or a relatively longer period than the first designated periodicity. According to an embodiment, when the difference (e.g., standard deviation) in performance indicator (e.g., throughputs 450 and 460 in FIG. 4) between cells included in the same sector exceeds a reference difference value, the processor 200 may determine that an imbalance between cells has occurred. According to an embodiment, when the minimum value of the performance indicators (e.g., throughputs 450 and 460 in FIG. 4) of cells is smaller than a reference value, the processor 200 may determine that an imbalance between cells has occurred. According to an embodiment, upon determining that an inter-cell imbalance has occurred (e.g., indicia 440 in FIG. 4), the processor 200 may determine to update a system variable in order to resolve the inter-cell imbalance.

According to various embodiments, upon determining not to update a system variable (e.g., 'no' at operation 305), the electronic device (e.g., processor 120 or 200) may end the embodiment for configuring (or, updating) a system variable.

According to various embodiments, upon determining to update a system variable (e.g., 'yes' at operation 305), at operation 307, the electronic device (e.g., processor 120 or 200) may identify a controlling indicator. According to an embodiment, the processor 200 may analyze a correlation between each of the plurality of statistical indicators and the performance indicator. The processor 200 may select a controlling indicator (e.g., RRC UE) having a correlation with the performance indicator among the plurality of statistical indicators. As an example, the controlling indicator may include a statistical indicator that causes a change in the performance indicator among the plurality of statistical indicators. For example, the performance indicator and the controlling indicator may include different statistical indicators. According to an embodiment, the processor 200 may configure a cell for improving an inter-cell imbalance among a plurality of cells as a source cell, and may configure a cell for improving the performance indicator of the source cell as a target cell. For example, the target cell may be selected based on an imbalance improvement amount corresponding to the required change amount of the controlling indicator. For example, the source cell and the target cell may include different cells.

According to various embodiments, at operation 309, the electronic device (e.g., processor 120 or 200) may update at least one system variable to change the controlling indicator of the target cell. According to an embodiment, the processor 200 may select at least one system variable for inducing a change in the controlling indicator of the target cell from among the plurality of system variables. The processor 200 may optimize each of the at least one system variable in sequence based on gradient descent. For example, the processor 200 may optimize, every third designated periodicity, a first system variable (e.g., distribution ratio of UEs) among the at least one system variable by repeatedly adjusting the value of the first system variable by a specified amount. For example, the third designated periodicity is a periodicity for updating the system variable, and may include at least one of an hourly unit 442, a daily unit 444, a weekly unit 446, a monthly unit, a yearly unit, or a specific time slot.

According to various embodiments, at operation 311, the electronic device (e.g., processor 120 or 200) may transmit information related to at least one updated system variable to at least one base station. According to an embodiment, the processor 200 may control the communication circuit 210 to transmit information about at least one updated system variable to at least one base station managing the target cell.

Figure 5:
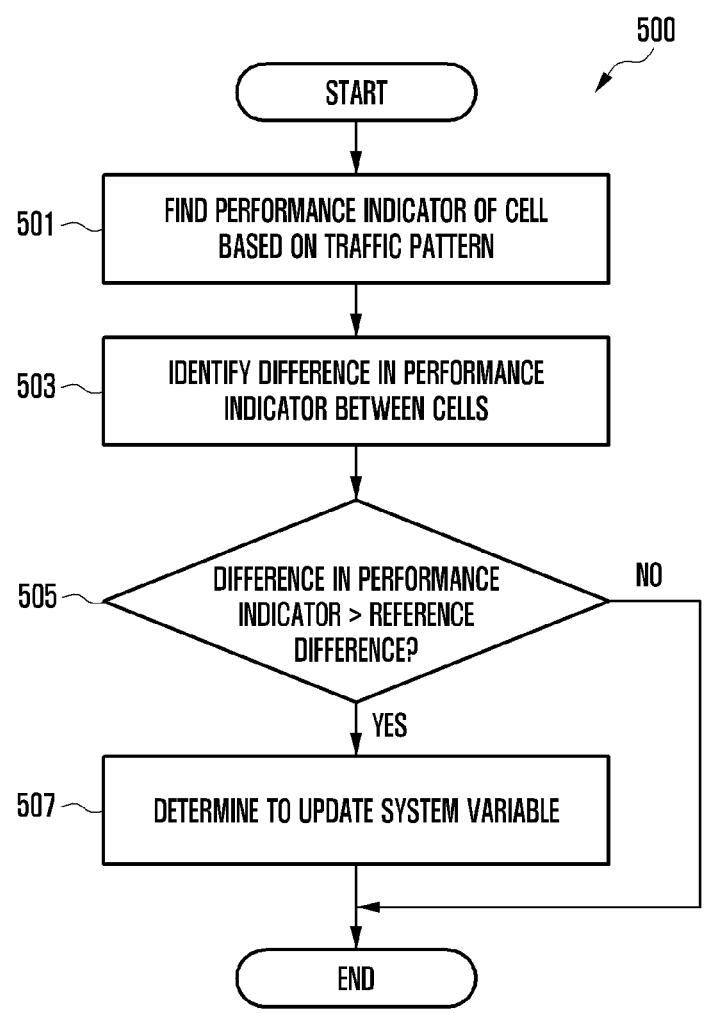
FIG. 5 is an example of a flowchart for an electronic device to determine whether to update a system variable according to an embodiment of the disclosure.

FIG. 5 is an example of a flowchart for an electronic device to determine whether to update a system variable according to an embodiment of the disclosure. According to an embodiment, the operations in FIG. 5 may be detailed ones of operation 305 in FIG. 3. Operations in the following embodiment may be sequentially performed, but are not necessarily performed in sequence. For example, the order of some operations may be changed, and at least two operations may be performed in parallel. For example, the electronic device of FIG. 5 is a network element of a wireless communication system supporting multiple frequencies, and may be the electronic device 101 of FIG. 1 or FIG. 2. For instance, at least a part of FIG. 5 may be described with reference to FIG. 7.

Figure 7:
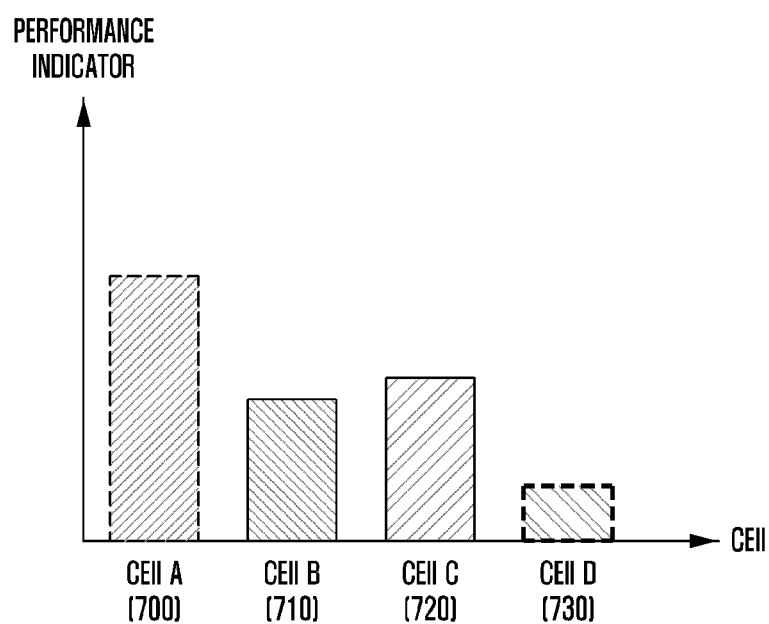
FIG. 7 is an example in which an electronic device determines whether to update a system variable based on a performance indicator of a cell according to an embodiment of the disclosure.

FIG. 7 is an example in which an electronic device determines whether to update a system variable based on a performance indicator of a cell according to an embodiment of the disclosure.

According to an embodiment with reference to flowchart 500 of FIG. 5, when traffic patterns for individual cells managed by a plurality of base stations are identified (e.g., operation 303 in FIG. 3), at operation 501, the electronic device (e.g., processor 120 in FIG. 1 or processor 200 in FIG. 2) may find a performance indicator among a plurality of statistical indicators. According to an embodiment, the processor 200 may select a performance indicator (or, network quality indicator) based on the traffic pattern of each of the plurality of statistical indicators. For example, a performance indicator may be selected based on at least one of a rule-based prediction method using a sliding window or a ML-based prediction method. As an example, the performance indicator may include a statistical indicator selected to determine whether an imbalance between cells occurs among the plurality of statistical indicators.

According to various embodiments, at operation 503, the electronic device (e.g., processor 120 or 200) may identify a difference (e.g., standard deviation) in the performance indicator between cells managed by a plurality of base stations.

According to an embodiment, referring to in FIG. 7, the electronic device 101 may collect statistical indicators of cell A (700), cell B (710), cell C (720), and cell D (730) included in the same sector. For instance, cell A (700), cell B (710), cell C (720), and cell D (730) may include different service areas supporting communication functions based on different frequency bands within the same sector. According to an embodiment, the processor 120 may detect a difference (e.g., standard deviation) in the performance indicator (e.g., throughput) between cell A (700), cell B (710), cell C (720), and cell D (730).

According to various embodiments, at operation 505, the electronic device (e.g., processor 120 or 200) may identify whether the difference (e.g., standard deviation) in the performance indicator between cells exceeds a reference difference. According to an embodiment, when a difference in performance indicator exceeding the reference difference is detected among the differences in performance indicator between cells, the processor 200 may determine that an imbalance between cells has occurred. According to an embodiment, when a difference in performance indicator exceeding the reference difference is not detected among the differences in performance indicator between cells, the processor 200 may determine that no imbalance between cells has occurred. For instance, the reference difference is a reference for determining whether an inter-cell imbalance has occurred, and may be fixed or be varied based on time and/or location (e.g., place).

According to various embodiments, if the difference (e.g., standard deviation) in the performance indicator between cells does not exceed the reference difference (e.g., 'no' at operation 505), the electronic device (e.g., processor 120 or 200) may end the embodiment for determining whether to update a system variable. According to an embodiment, upon determining that no imbalance between cells has occurred, the processor 200 may determine not to update a system variable of the wireless communication system.

According to various embodiments, if the difference (e.g., standard deviation) in the performance indicator between cells exceeds the reference difference (e.g., 'yes' at operation 505), at operation 507, the electronic device (e.g., processor 120 or 200) may determine to update a system variable. According to an embodiment, if the difference (e.g., standard deviation) in the performance indicator between cell A (700) and cell D (730) in FIG. 7 exceeds the reference difference, the processor 200 may determine that an imbalance between cells has occurred. The processor 200 may determine to update a system variable in order to resolve the imbalance between cells (e.g., 'yes' at operation 305 in FIG. 3).

Figure 6:
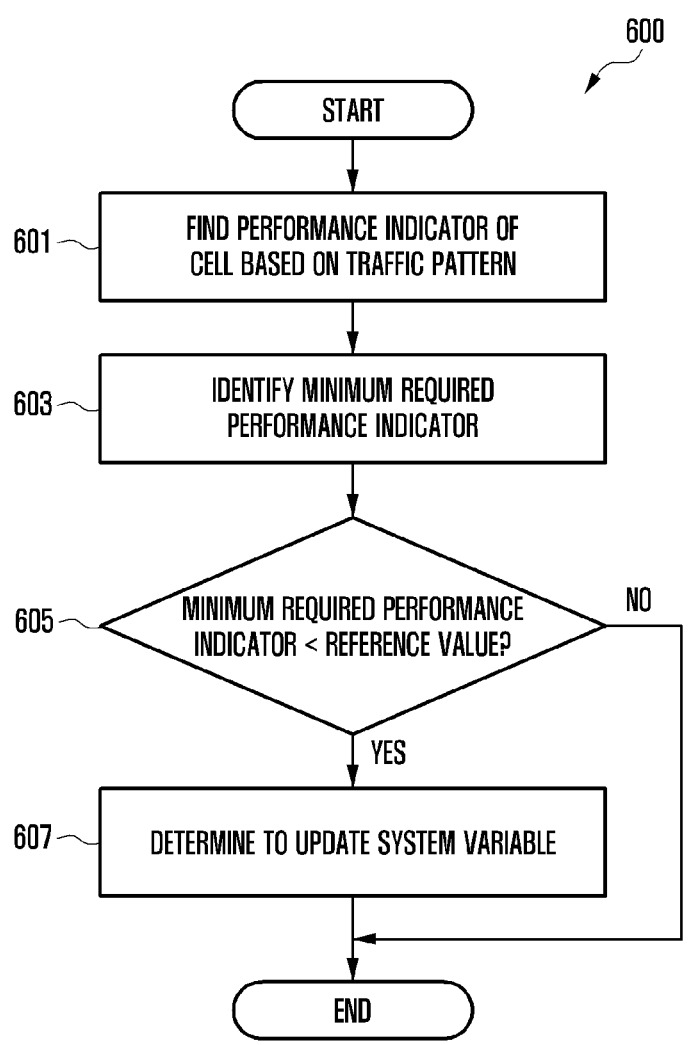
FIG. 6 is another example of a flowchart for an electronic device to determine whether to update a system variable according to an embodiment of the disclosure.

FIG. 6 is another example of a flowchart for an electronic device to determine whether to update a system variable according to an embodiment of the disclosure. According to an embodiment, the operations in FIG. 6 may be detailed ones of operation 305 in FIG. 3. Operations in the following embodiment may be sequentially performed, but are not necessarily performed in sequence. For example, the order of some operations may be changed, and at least two operations may be performed in parallel. For example, the electronic device of FIG. 5 is a network element of a wireless communication system supporting multiple frequencies, and may be the electronic device 101 of FIG. 1 or FIG. 2.

According to an embodiment with reference to flowchart 600 of FIG. 6, when traffic patterns for individual cells managed by a plurality of base stations are identified (e.g., operation 303 in FIG. 3), at operation 601, the electronic device (e.g., processor 120 in FIG. 1 or processor 200 in FIG. 2) may find a performance indicator among a plurality of statistical indicators. The processor 200 may select a performance indicator (or, network quality indicator) through at least one of a rule-based prediction method based on traffic patterns of the plurality of statistical indicators or an ML-based prediction method. As an example, the performance indicator may include a statistical indicator selected to determine whether an imbalance between cells occurs among the plurality of statistical indicators.

In various embodiments, at operation 603, the electronic device (e.g., processor 120 or 200) may find a minimum value (e.g., minimum required performance indicator) in the performance indicator of individual cells managed by the plurality of base stations. According to an embodiment, as shown in FIG. 7, the processor 200 may identify the performance indicator of cell D (730) being the minimum required performance indicator among cell A (700), cell B (710), cell C (720), and cell D (730) operated by the electronic device 101.

According to various embodiments, at operation 605, the electronic device (e.g., processor 120 or 200) may determine whether the minimum required performance indicator is less than a reference value. According to an embodiment, if the minimum required performance indicator is less than the reference value, the processor 200 may determine that an imbalance between cells has occurred. According to an embodiment, if the minimum required performance indicator is greater than or equal to the reference value, the processor 200 may determine that no imbalance between cells has occurred. For instance, the reference value is a reference value for determining whether an inter-cell imbalance has occurred, and may be fixed or be varied based on time and/or place.

According to various embodiments, if the minimum required performance indicator is greater than or equal to the reference value (e.g., 'no' at operation 605), the electronic device (e.g., processor 120 or 200) may end the embodiment for determining whether to update a system variable. According to an embodiment, upon determining that no imbalance between cells has occurred, the processor 200 may determine not to update a system variable of the wireless communication system.

According to various embodiments, if the minimum required performance indicator is less than the reference value (e.g., 'yes' at operation 605), at operation 607, the electronic device (e.g., processor 120 or 200) may determine to update a system variable. According to an embodiment, if the value of the performance indicator of cell D (730) in FIG. 7 is smaller than the reference value, the processor 200 may determine that an imbalance between cells has occurred. The processor 200 may determine to update a system variable in order to resolve the imbalance between cells (e.g., 'yes' at operation 305 in FIG. 3).

Figure 8:
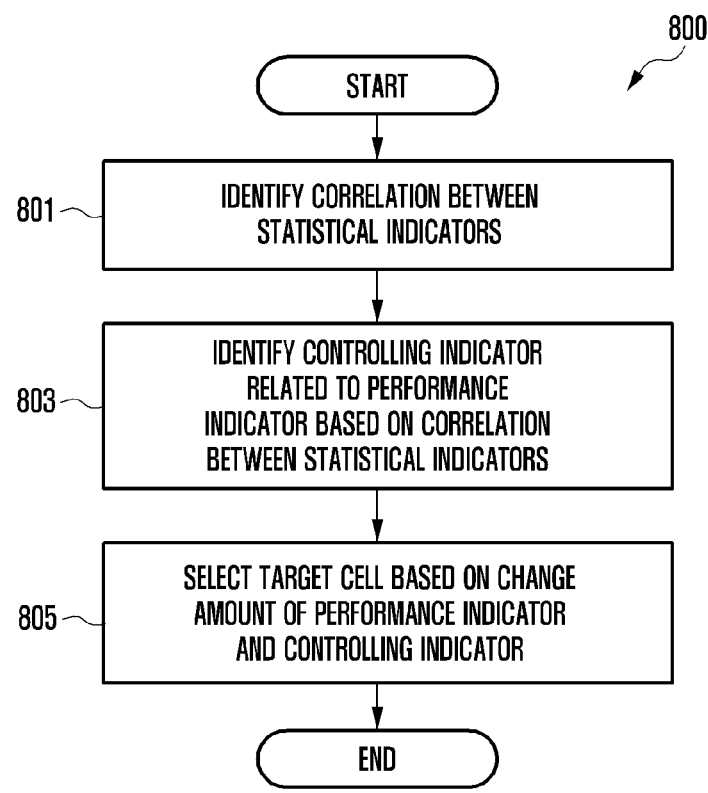
FIG. 8 is a flowchart for an electronic device to select a performance indicator and a target cell according to an embodiment of the disclosure.

FIG. 8 is a flowchart for an electronic device to select a controlling indicator and a target cell according to an embodiment of the disclosure. According to an embodiment, the operations in FIG. 8 may be detailed ones of operation 307 in FIG. 3. Operations in the following embodiment may be sequentially performed, but are not necessarily performed in sequence. For example, the order of some operations may be changed, and at least two operations may be performed in parallel. For example, the electronic device of FIG. 8 is a network element of a wireless communication system supporting multiple frequencies, and may be the electronic device 101 of FIG. 1 or FIG. 2. For instance, at least a part of FIG. 8 may be described with reference to FIG. 9 and FIG. 10.

Figure 9:
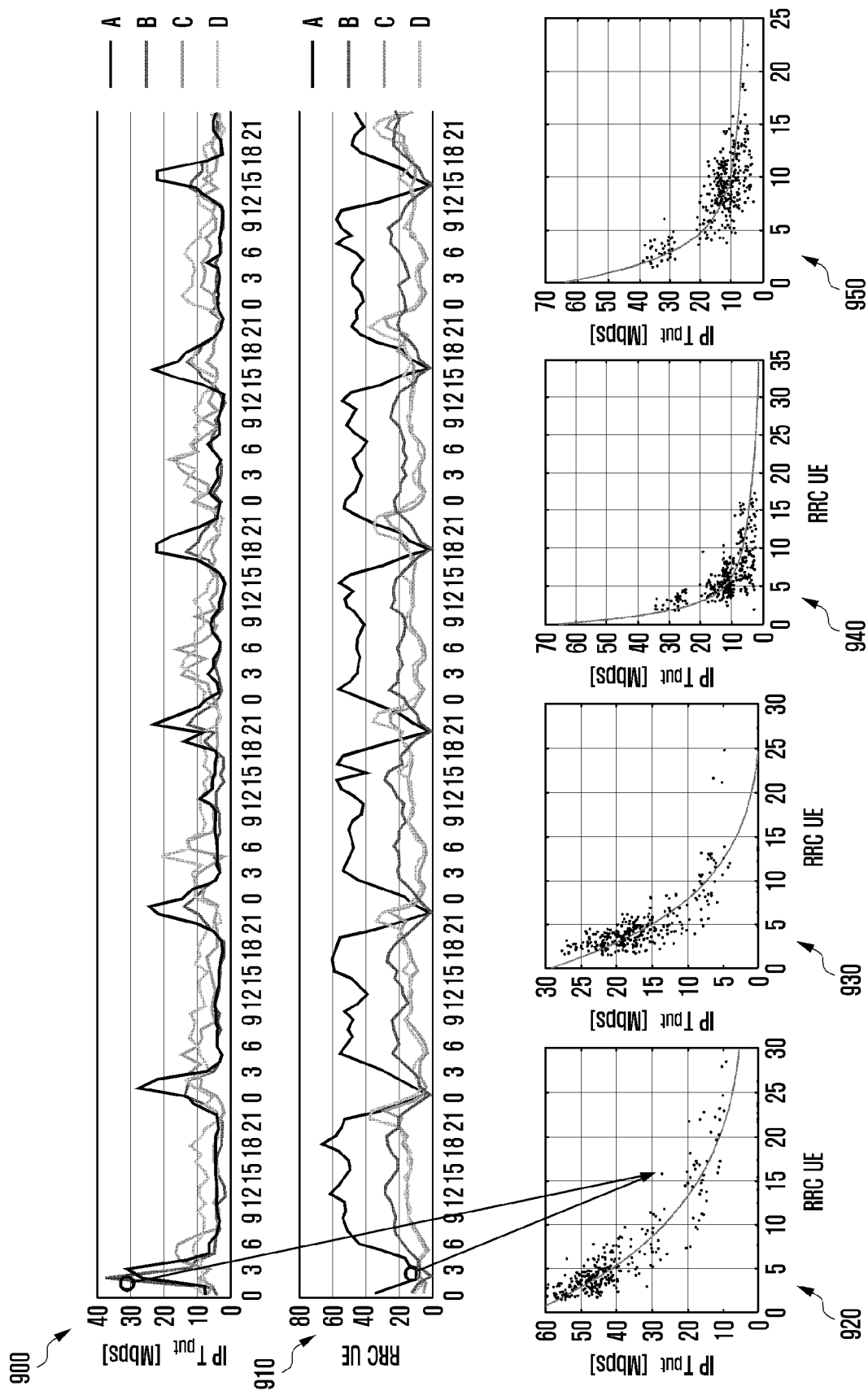
FIG. 9 is an example in which an electronic device detects a correlation between statistical indicators according to an embodiment of the disclosure.

FIG. 9 is an example in which an electronic device detects a correlation between statistical indicators according to an embodiment of the disclosure.

Figure 10:
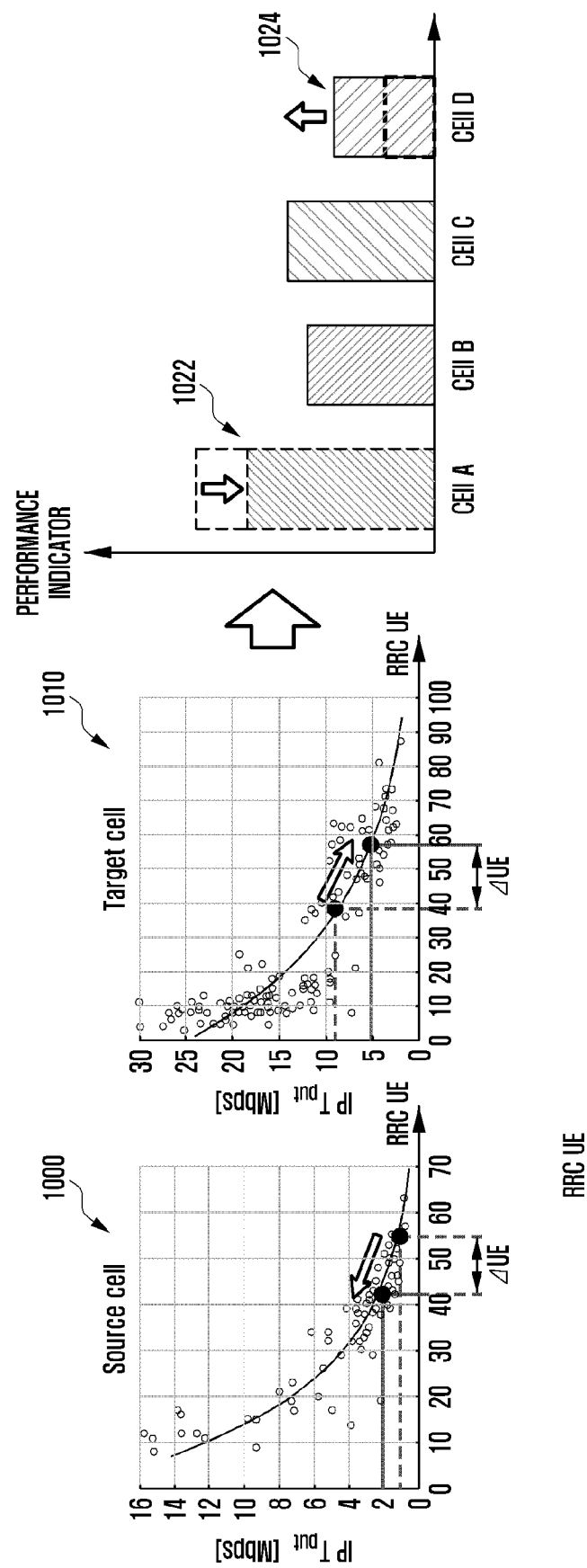
FIG. 10 is an example in which an electronic device predicts a required change amount of a controlling indicator according to an embodiment of the disclosure.

FIG. 10 is an example in which an electronic device predicts a required change amount of a controlling indicator according to an embodiment of the disclosure.

According to an embodiment with reference to flowchart 800 of FIG. 8, when it is determined to update a system variable (e.g., 'yes' at operation 305 in FIG. 3), at operation 801, the electronic device (e.g., processor 120 in FIG. 1 or processor 200 in FIG. 2) may identify a correlation between each of a plurality of statistical indicators and the performance indicator. According to an embodiment, the processor 200 may analyze a correlation between each statistical indicator and the performance indicator.

For example, referring to FIG. 9, based on traffic pattern 900 of the performance indicator (e.g., throughput) of each cell and traffic pattern 910 of a statistical indicator (e.g., RRC UE) different from the performance indicator, the processor 200 may analyze the correlation between the performance indicator and the statistical indicator (e.g., correlation 920 for cell A, correlation 930 for cell B, correlation 940 for cell C, and correlation 950 for cell D).

According to various embodiments, at operation 803, the electronic device (e.g., processor 120 or 200) may identify a controlling indicator having a correlation with the performance indicator based on the correlation between each statistical indicator and the performance indicator. According to an embodiment, the processor 200 may select one of the plurality of statistical indicators as a controlling indicator (e.g., RRC UE) based on the correlation with the performance indicator. As an example, the controlling indicator may include a statistical indicator that causes a change in the performance indicator among the plurality of statistical indicators. For example, the performance indicator and the controlling indicator may include different statistical indicators. According to an embodiment, when there are multiple statistical indicators having a correlation with the performance indicator, the processor 200 may select one of the statistical indicators as a controlling indicator (e.g., RRC UE) based on the priority of the statistical indicators corresponding to the performance indicator. For example, the priority of the statistical indicators may be identified in a priority table configured based on time and/or location (e.g., place). The priority table may be configured and/or updated based on the selection history of the controlling indicator.

According to various embodiments, at operation 805, the electronic device (e.g., processor 120 or 200) may select a target cell for improving the imbalance of the source cell based on a required change amount between the performance indicator of each cell and the controlling indicator. According to an embodiment, the processor 200 may configure a cell for improving the inter-cell imbalance among the plurality of cells as a source cell.

For example, referring to FIG. 10, the processor 200 may configure, among cell A, cell B, cell C, and cell D managed by the plurality of base stations, cell D having the lowest performance indicator value as a source cell.

According to an embodiment, the processor 200 may configure, among the plurality of cells, a cell having the largest imbalance improvement amount for the source cell as a target cell based on the performance indicator of each cell and the required change amount of the controlling indicator. For instance, the required change amount of the controlling indicator may be found through the correlation between the performance indicator and the controlling indicator. According to an embodiment, the processor 200 may interwork with the source cell (e.g., cell D) to change the controlling indicator (e.g., RRC UE) of the source cell (e.g., cell D) (e.g., ΔUE in FIG. 10), and may configure cell A, which is a cell capable of maximally improving the performance indicator (e.g., throughput) of the source cell (e.g., cell D), as a target cell. For example, the target cell may include a cell having a maximum imbalance improvement amount found based on the expected change amount of the performance indicator of the target cell (indicia 1010 and 1022 in FIG. 10) obtained by changing the controlling indicator of the target cell (e.g., adding ΔUE) and the expected change amount of the performance indicator of the source cell (indicia 1000 and 1024 in FIG. 10) obtained by changing the controlling indicator of the source cell (e.g., subtracting ΔUE). For example, the imbalance improvement amount (or, required change amount of the performance indicator of the source cell) may be set based on the average value and/or standard deviation of the performance indicators of cells included in the same sector.

Figure 11:
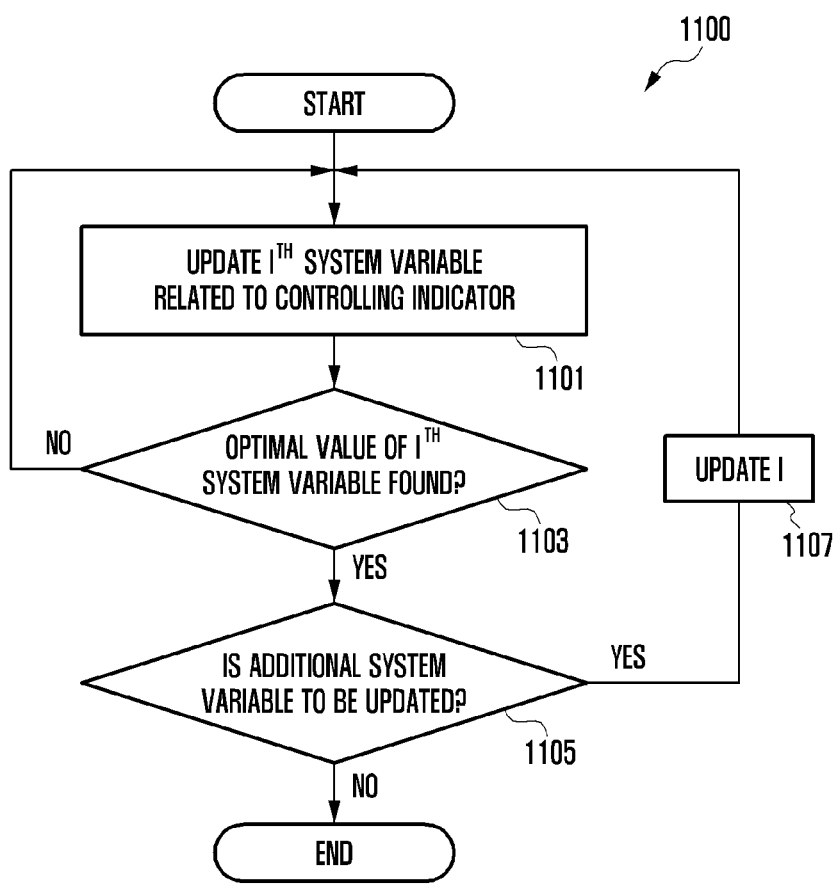
FIG. 11 is a flowchart for an electronic device to update system variables according to an embodiment of the disclosure.

FIG. 11 is a flowchart for an electronic device to update system variables according to an embodiment of the disclosure. According to an embodiment, the operations in FIG. 11 may be detailed ones of operation 309 in FIG. 3. Operations in the following embodiment may be sequentially performed, but are not necessarily performed in sequence. For example, the order of some operations may be changed, and at least two operations may be performed in parallel. For example, the electronic device of FIG. 11 is a network element of a wireless communication system supporting multiple frequencies, and may be the electronic device 101 of FIG. 1 or FIG. 2. For instance, at least a part of FIG. 11 may be described with reference to FIG. 12.

Figure 12:
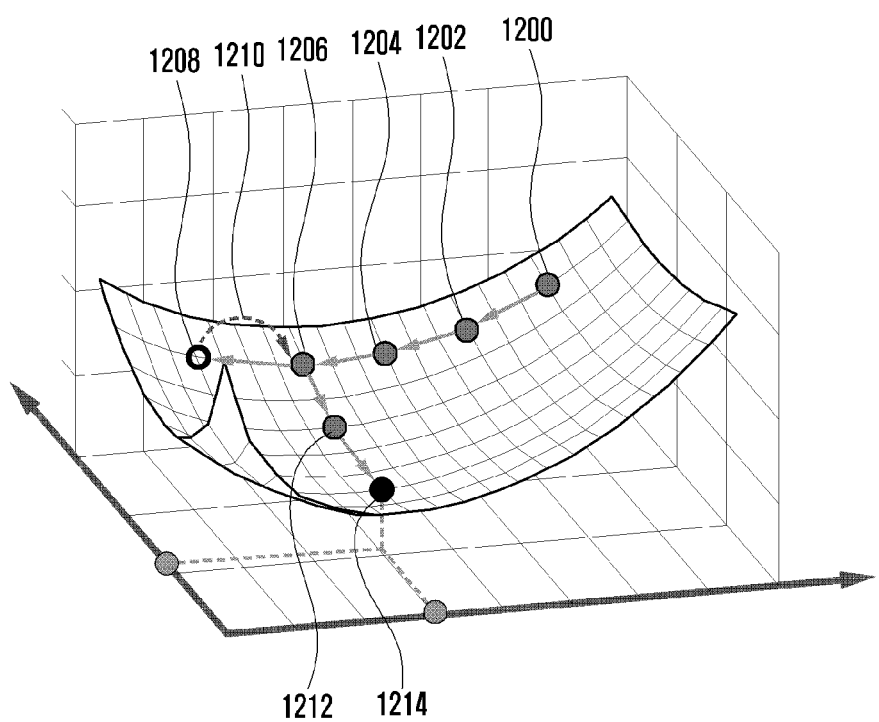
FIG. 12 is an example in which an electronic device updates a system variable according to embodiment of the disclosure.

FIG. 12 is an example in which an electronic device updates a system variable according to an embodiment of the disclosure.

According to an embodiment with reference to flowchart 1100 of FIG. 11, when the controlling indicator is identified (e.g., operation 307 in FIG. 3), at operation 1101, the electronic device (e.g., processor 120 in FIG. 1 or processor 200 in FIG. 2) may update the $i^{th}$ system variable corresponding to the controlling indicator. According to an embodiment, the processor 200 may select at least one system variable for inducing a change in the controlling indicator of the target cell from among a plurality of system variables. When the third designated periodicity arrives, the processor 200 may update the $i^{th}$ system variable (e.g., UE distribution ratio) by a specified amount. For example, the processor 200 may update the $i^{th}$ system variable by a specified magnitude as shown in FIG. 12 (indicia 1200→1202).

According to various embodiments, at operation 1103, the electronic device (e.g., processor 120 or 200) may identify whether the optimal value of the $i^{th}$ system variable is found. According to an embodiment, the processor 200 may detect a change in the performance indicator of the wireless communication system based on the update of the $i^{th}$ system variable. For example, when the performance indicator of the wireless communication system is improved, the processor 200 may determine that the optimal value of the $i^{th}$ system variable is not found. For example, when the performance indicator of the wireless communication system is deteriorated or not improved, the processor 200 may determine that the optimal value of the $i^{th}$ system variable is found. For example, the optimal value of the $i^{th}$ system variable may include a value before being updated at operation 1101 (e.g., indicia 1210 in FIG. 12).

According to various embodiments, upon determining that the optimal value of the $i^{th}$ system variable is not found (e.g., 'no' at operation 1103), at operation 1101, the electronic device (e.g., processor 120 or 200) may update the $i^{th}$ system variable corresponding to the controlling indicator.

According to an embodiment, referring to FIG. 12, when the optimal value of the $i^{th}$ system variable is not detected, the processor 200 may repeatedly update the $i^{th}$ system variable by a specified magnitude every third designated periodicity (indicia 1200, 1202, 1204, 1206, 1208).

According to various embodiments, upon determining that the optimal value of the $i^{th}$ system variable has been found (e.g., 'yes' at operation 1103), at operation 1105, the electronic device (e.g., processor 120 or 200) may identify whether there is a system variable to be additionally updated. According to an embodiment, the processor 200 may identify whether all the system variables selected to induce a change in the controlling indicator of the target cell are optimized. For example, if the system variable identifier (i) is greater than or equal to the maximum identifier value (iMAX), the processor 200 may determine that all the system variables selected to induce a change in the controlling indicator of the target cell are optimized. For example, if the system variable identifier (i) is less than the maximum identifier value (iMAX), the processor 200 may determine that all the system variables selected to induce a change in the controlling indicator of the target cell are not optimized. For instance, the system variable identifier (i), as identification information for distinguishing the system variables selected to induce a change in the controlling indicator of the target cell, may include a natural number greater than or equal to 1.

According to various embodiments, if there is a system variable to be additionally updated (e.g., 'yes' at operation 1105), at operation 1107, the electronic device (e.g., processor 120 or 200) may update the system variable identifier (i) (e.g., i+1).

According to various embodiments, at operation 1101, the electronic device (e.g., processor 120 or 200) may update the i+1th system variable corresponding to the controlling indicator. According to an embodiment, when the third designated periodicity arrives, as shown in FIG. 12, the processor 200 may update the i+1th system variable by a specified amount (indicia 1206→1212). According to an embodiment, as shown in FIG. 12, the processor 200 may repeatedly update the i+1th system variable by a specified magnitude every third designated periodicity until the optimal value of the i+1th system variable is found (indicia 1206, 1212, 1214).

According to various embodiments, if there is no system variable to be additionally updated (e.g., 'no' at operation 1105), the electronic device (e.g., processor 120 or 200) may determine that the system variable of the wireless communication system has been optimized. The electronic device (e.g., processor 120 or 200) may end the embodiment for updating the system variable.

According to various embodiments, the electronic device 101 may determine whether each system variable is optimized by considering not only a change in the performance indicator but also a change in at least one main statistical indicator. The at least one main statistical indicator may include at least one of throughput (e.g., IP throughput), load, RRC UE, active UE, physical resource usage (PRB usage), or traffic volume.

Figure 13:
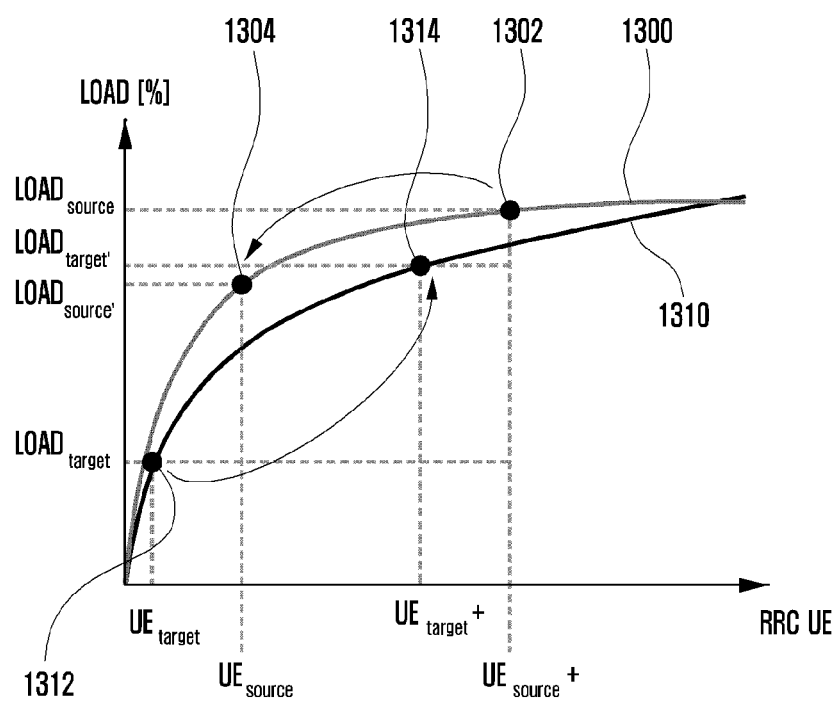
FIG. 13 is an example of a required change amount of a controlling indicator for an electronic device to update a system variable according to an embodiment of the disclosure.

FIG. 13 is an example of a change amount of a controlling indicator for an electronic device to update a system variable according to an embodiment of the disclosure.

According to an embodiment with reference to FIG. 13, the electronic device 101 may update a cell reselection criterion (e.g., cell capacity class value (CCCV)) so that the distribution ratio of RRC-connected UEs in each cell is adjusted. According to an embodiment, the distribution ratio of RRC-connected UEs in a cell may be calculated based on Equation 1 below.

$$UE\ distribution_i\ [\%] = \frac{(100 - LOAD_i) \cdot CCCV_i}{\sum_{k}^{N_{cell}}(100 - LOAD_k) \cdot CCCV_k} \quad \text{Equation 1}$$

For example, UE distribution$_i$ may include a distribution ratio of RRC-connected UEs in the i$^{th}$ cell. $N_{cell}$ may include the number of cells included in a sector. LOAD$_i$ may include the load of the i$^{th}$ cell. CCCV$_i$ may include the resource capacity state of the i$^{th}$ cell.

According to an embodiment, the processor 200 may update the CCCV of the source cell so that the number of RRC-connected UEs in the source cell decreases. For example, the CCCV of the source cell may be updated as in Equation 2 below.

$$CCCV'_{source} = \frac{(UE_{source} - \Delta_{UE})}{UE_{source}} \cdot \frac{(100 - LOAD_{source}) \cdot CCCV_{source}}{(100 - LOAD_{source} + \Delta_{LOAD_{source}})} \quad \text{Equation 2}$$

For example, CCCV'$_{source}$ may include the updated CCCV of the source cell. UE$_{source}$ may include the number of RRC-connected UEs currently in the source cell. $\Delta_{UE}$ may include the number of UEs to be adjusted for improvement of the performance indicator of the source cell.

According to an embodiment, the processor 200 may update the CCCV of the target cell so that the number of RRC-connected UEs in the target cell increases based on RRC-connected UEs in the source cell. For example, the CCCV of the target cell may be updated as in Equation 3 below.

$$CCCV'_{target} = \frac{(UE_{target} + \Delta_{UE})}{UE_{target}} \cdot \frac{(100 - LOAD_{target}) \cdot CCCV_{target}}{(100 - LOAD_{target} - \Delta LOAD_{target})} \quad \text{Equation 3}$$

For instance, CCCV'$_{target}$ may include the updated CCCV of the target cell. UE$_{target}$ may include the number of RRC-connected UEs currently in the target cell. $\Delta_{UE}$ may include the number of UEs to be adjusted for improvement of the performance indicator of the target cell.

According to an embodiment, the electronic device 101 may update the CCCV of the source cell to reduce the number of RRC-connected UEs in the source cell (e.g., decreasing $\Delta_{UE}$), so that the load of the source cell (LOAD$_{source}$) may be decreased from a first value 1302 to a second value 1304 (graph line 1300).

According to an embodiment, the electronic device 101 may update the CCCV of the target cell to increase the number of RRC-connected UEs in the target cell (e.g., increasing $\Delta_{UE}$), so that the load of the target cell (LOAD$_{target}$) may be increased from a third value 1312 to a fourth value 1314 (graph line 1310).

Figure 14:
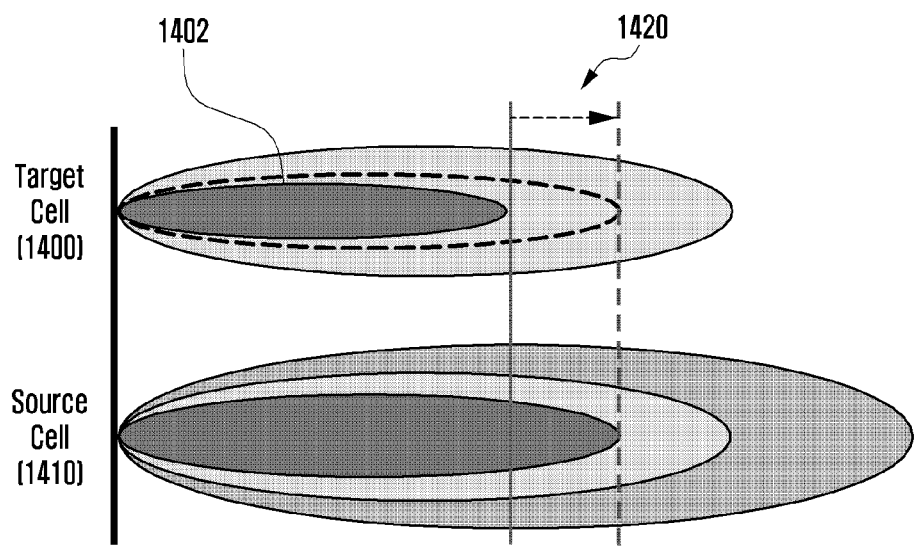
FIG. 14 is another example in which an electronic device updates a system variable according to an embodiment of the disclosure.

FIG. 14 is another example in which an electronic device updates a system variable according to an embodiment of the disclosure.

Figure 15:
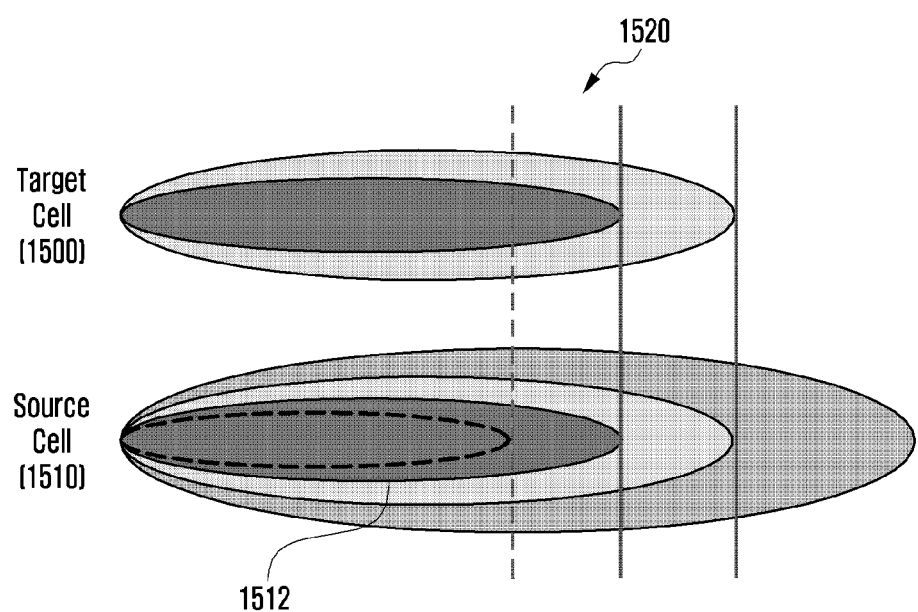
FIG. 15 is another example in which an electronic device updates a system variable according to an embodiment of the disclosure.

FIG. 15 is another example in which an electronic device updates a system variable according to an embodiment of the disclosure.

According to various embodiments with reference to FIGS. 14 and 15, the electronic device 101 may update a handover variable so that the distribution ratio of RRC-connected UEs in each cell is adjusted.

According to an embodiment, referring to FIG. 14, the electronic device 101 may expand the size of the camping area 1402 of the target cell 1400 so that the ratio of UEs that camp on the source cell 1410 (e.g., ratio of camping UEs) increases (1420).

According to an embodiment, referring to FIG. 15, the electronic device 101 may reduce the size of the camping area 1512 of the source cell 1510 so that the ratio of UEs that camp on the target cell 1500 (e.g., ratio of camping UEs) increases (1520).

According to an embodiment, the electronic device 101 may control to handover (e.g., forced handover) at least some of UEs connected to the source cell to the target cell. For example, the electronic device 101 may adjust the size of the forced handover area of the source cell and/or the target cell to handover (e.g., forced handover) at least some of the UEs, with a relatively high electric field strength, connected to the source cell to the target cell.

According to various embodiments, an operation method of an electronic device (e.g., electronic device 101 in FIG. 1 or FIG. 2) in a wireless communication system supporting multiple frequencies may include collecting a plurality of statistical indicators for each of a plurality of cells managed by multiple base stations, identifying a traffic pattern for each cell based on at least one of the plurality of statistical indicators, configuring, upon determining to update a system variable of at least one cell based on the traffic pattern for each cell, at least one of the plurality of statistical indicators as a controlling indicator based on the correlation between a performance indicator of the statistical indicators and the other statistical indicators, identifying a required change amount of the at least one controlling indicator based on the traffic pattern for each cell, updating at least one system variable for at least one cell based on the required change amount of the at least one controlling indicator, and transmitting information related to the at least one updated system variable to at least one base station.

According to various embodiments, the statistical indicators may include at least one of throughput (IP throughput), load, number of radio resource control (RRC)-connected UEs, number of UEs under data transmission, physical resource usage (physical resource block (PRB) usage), or traffic volume.

According to various embodiments, the operation method may further include determining to update the system variable of the at least one cell when the standard deviation of the performance indicator between the plurality of cells using different frequencies in the same sector exceeds a specified reference value.

According to various embodiments, the operation method may further include determining to update the system variable of the at least one cell when the minimum value among the performance indicators of the plurality of cells using different frequencies in the same sector is less than or equal to a specified reference value.

According to various embodiments, updating at least one system variable for at least one cell may include configuring a cell whose performance indicator is lowest among the plurality of cells as a source cell, configuring one cell among other cells included in the same sector as the source cell, as a target cell, based on the required change amount of the performance indicator of the source cell, and updating at least one system variable corresponding to the source cell and the target cell.

According to various embodiments, updating at least one system variable may include identifying, upon determining to update the system variable of the at least one cell, a required change amount of the performance indicator of the source cell, and identifying a required change amount of the controlling indicator based on the correlation between the performance indicator of the source cell and the controlling indicator of the target cell, deriving an update value of at least one system variable for the at least one cell based on the required change amount of the performance indicator of the source cell and/or the required change amount of the controlling indicator, and updating the at least one system variable based on the derived update value of the at least one system variable.

According to various embodiments, the required change amount of the performance indicator of the source cell may be set up based on the average of performance indicators of other cells included in the same sector as the source cell and/or the standard deviation of performance indicators of the plurality of cells.

According to various embodiments, updating the at least one system variable may include selecting at least one system variable related to a change in the performance indicator from among at least one system variable corresponding to the source cell and/or the target cell, and sequentially updating the at least one system variable related to a change in the performance indicator.

According to various embodiments, the at least one system variable may include a variable related to cell reselection between multiple frequencies in RRC idle mode of a UE and/or a variable related to handover between multiple frequencies in RRC connected mode of a UE.

According to various embodiments, the performance indicator and the controlling indicator may include different statistical indicators.

According to various embodiments of the disclosure, an electronic device (e.g., network element) in a wireless communication system supporting multiple frequencies configures (or, updates) system variables based on a change in traffic for each frequency of individual cells managed by a plurality of base stations, so that the system variables may be optimized in response to traffic changes by time and/or location (e.g., place).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device in a wireless communication system supporting multiple frequencies, the electronic device comprising:
a communication circuit; and
a processor operably connected to the communication circuit,
wherein the processor is configured to:
collect, through the communication circuit, a plurality of statistical indicators for each of a plurality of cells managed by multiple base stations,
identify a traffic pattern for each cell based on at least one of the plurality of statistical indicators,
in case of determining to update a system variable of at least one cell based on the traffic pattern for each cell, configure at least one of the plurality of statistical indicators as a controlling indicator based on a correlation between a performance indicator of the plurality of statistical indicators and other statistical indicators among the plurality of statistical indicators,
identify a required change amount of the at least one controlling indicator based on the traffic pattern for each cell,
update at least one system variable of the at least one cell based on the required change amount of the at least one controlling indicator, and transmit, through the communication circuit, information related to the updated at least one system variable to at least one base station.

2. The electronic device of claim 1, wherein the plurality of statistical indicators comprise at least one of a throughput, a load, a number of radio resource control (RRC)-connected user equipments (UEs), a number of UEs under data transmission, physical resource block (PRB) usage, or traffic volume.

3. The electronic device of claim 1, wherein the processor is further configured to, in case that a standard deviation of the performance indicator between the plurality of cells using different frequencies in a same sector exceeds a specified reference value, determine to update the at least one system variable of the at least one cell.

4. The electronic device of claim 1, wherein the processor is further configured to, in case that a minimum value among performance indicators of the plurality of cells using different frequencies in a same sector is less than or equal to a specified reference value, determine to update the at least one system variable of the at least one cell.

5. The electronic device of claim 1, wherein the processor is further configured to:
configure a cell whose performance indicator is lowest among the plurality of cells as a source cell,
configure one cell as a target cell among other cells included in a same sector as the source cell based on a required change amount of the performance indicator of the source cell, and
update the at least one system variable corresponding to the source cell and the target cell.

6. The electronic device of claim 5, wherein the processor is further configured to:
in case of determining to update the at least one system variable of the at least one cell, identify the required change amount of the performance indicator of the source cell, and identify the required change amount of the at least one controlling indicator, based on a correlation between the performance indicator of the source cell and the at least one controlling indicator of the target cell, and
derive an update value of the at least one system variable for the at least one cell based on at least one of the required change amount of the performance indicator of the source cell or the required change amount of the at least one controlling indicator.

7. The electronic device of claim 6, wherein the required change amount of the performance indicator of the source cell is set based on at least one of an average of performance indicators of the other cells included in the same sector as the source cell or a standard deviation of performance indicators of a plurality of cells included in the same sector.

8. The electronic device of claim 6, wherein the processor is further configured to:
select at least one system variable related to a change in the performance indicator from among at least one system variable corresponding to at least one of the source cell or the target cell, and
sequentially update the at least one system variable related to the change in the performance indicator.

9. The electronic device of claim 1, wherein the at least one system variable comprises at least one of a variable related to cell reselection between multiple frequencies in radio resource control (RRC) idle mode of a user equipment (UE) or a variable related to handover between multiple frequencies in RRC connected mode of the UE.

10. A method of operating an electronic device in a wireless communication system supporting multiple frequencies, the method comprising:
collecting a plurality of statistical indicators for each of a plurality of cells managed by multiple base stations;
identifying a traffic pattern for each cell based on at least one of the plurality of statistical indicators;
in case of determining to update a system variable of at least one cell based on the traffic pattern for each cell, configuring at least one of the plurality of statistical indicators as a controlling indicator based on a correlation between a performance indicator of the plurality of statistical indicators and other statistical indicators among the plurality of statistical indicators;
identifying a required change amount of the at least one controlling indicator based on the traffic pattern for each cell;
updating at least one system variable of the at least one cell based on the required change amount of the at least one controlling indicator; and
transmitting information related to the updated at least one system variable to at least one base station.

11. The method of claim 10, further comprising, in case that a standard deviation of the performance indicator between the plurality of cells using different frequencies in a same sector exceeds a specified reference value, determining to update the at least one system variable of the at least one cell.

12. The method of claim 10, further comprising, in case that a minimum value among performance indicators of the plurality of cells using different frequencies in a same sector is less than or equal to a specified reference value, determining to update system variables of the plurality of cells.

13. The method of claim 10, wherein the updating of the at least one system variable of the at least one cell comprises:
configuring a cell whose performance indicator is lowest among the plurality of cells as a source cell;
configuring one cell as a target cell among other cells included in a same sector as the source cell based on a required change amount of the performance indicator of the source cell; and
updating the at least one system variable corresponding to the source cell and the target cell.

14. The method of claim 13, wherein the updating of the at least one system variable further comprises:
in case of determining to update the at least one system variable of the at least one cell, identifying the required change amount of the performance indicator of the source cell and identifying the required change amount of the at least one controlling indicator based on the correlation between the performance indicator of the source cell and the at least one controlling indicator of the target cell;
deriving an update value of at least one system variable for the at least one cell based on at least one of the required change amount of the performance indicator of the source cell or the required change amount of the at least one controlling indicator; and
updating the at least one system variable based on the derived update value of the at least one system variable.

15. The method of claim 14, wherein the required change amount of the performance indicator of the source cell is set based on at least one of an average of performance indicators of the other cells included in the same sector as the source cell or a standard deviation of performance indicators of the plurality of cells.

16. The method of claim 14, wherein the required change amount of the performance indicator of the source cell is set based on at least one of an average of performance indicators of the other cells included in the same sector as the source cell or a standard deviation of performance indicators of a plurality of cells included in the same sector.

17. The method of claim 10, wherein the traffic pattern indicates a change pattern of each of the plurality of statistical indicators with a passage of time.

18. The method of claim 10, wherein the at least one system variable comprises at least one of a distribution ratio of UEs, a handover variable, or a load ratio.

19. The method of claim 10, wherein the performance indicator and the controlling indicator comprise different statistical indicators.

20. The method of claim 10, further comprising, in response to determining to update the system variable, identifying at least one correlation between each of plurality of statistical indicators and the performance indicator.

* * * * *